Figure 1:
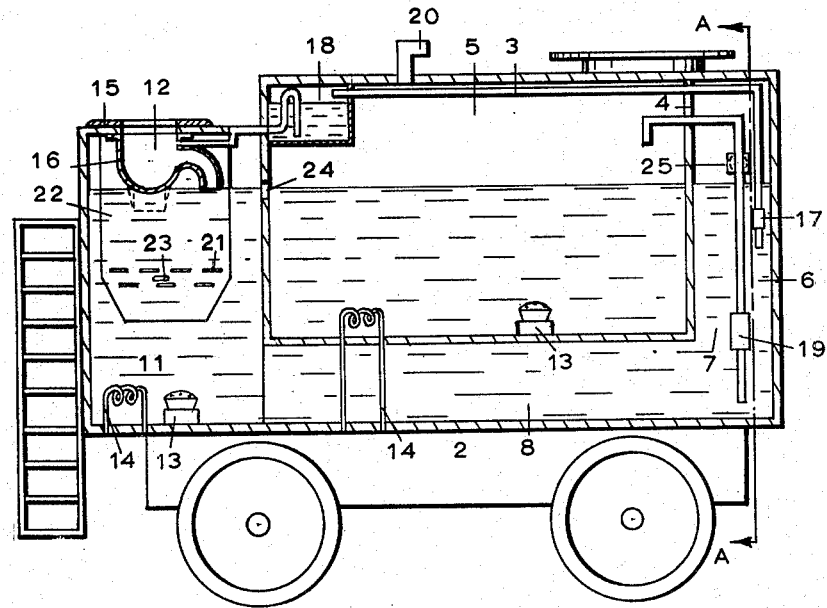

March 30, 1965 M. A. VAN DEN BERG 3,175,887
APPARATUS FOR THE AEROBIC DIGESTION OF NIGHT SOIL
Filed April 15, 1963

INVENTOR
MICHAEL ADRIAAN VAN DEN BERG

By *Shoemaker and Mattare*

Attys.

United States Patent Office 3,175,887
Patented Mar. 30, 1965

3,175,887
APPARATUS FOR THE AEROBIC DIGESTION OF NIGHT SOIL
Michael A. van den Berg, Klipfontein, Boksburg North, Transvaal, Republic of South Africa, assignor to Wright Anderson (South Africa) Limited, Boksburg North, Transvaal, Republic of South Africa
Filed Apr. 15, 1963, Ser. No. 272,986
Claims priority, application Republic of South Africa, May 10, 1962, 62/1,805
5 Claims. (Cl. 23—259.1)

This invention relates to a method and apparatus for the aerobic digestion of night soil. While not confined thereto this invention has been developed for, and has particular application to underground mines, in which special sewage disposal problems exist. For example, it is not normally possible to install a waterborne sewage system. Latrines located in fixed areas apart from the normal objections thereto, are unsatisfactory as there is continual advance of the working areas, and also night soil cannot safely be disposed of in the mine and must be hauled to the surface.

Equipment is known for the aerobic treatment of night soil in which the latter is flushed from a toilet bowl into a tank embodying aerating equipment, part of the effluent mixture in the tank being circulated for flushing purposes. Such equipment has a digestion rate sufficiently low to preclude its use as a unit of acceptable size in commercial applications where high loading occurs over short periods and where the unit is also required either to be mobile or to be transportable from one working site to another.

The present invention is to an extent based on the principles of operation of known installations suitable for the treatment of raw waterborne sewage and like waterborne wastes by the activated sludge process, with extended aeration. Such known installations, however, necessarily involve laying of sewage piping and discharge of considerable quantities of effluent so that they are inherently unsuitable for the type of commercial applications referred to above.

Generally it is the object of this invention to provide a method and apparatus for the treatment of night soil particularly for use in underground mines but also applicable to other uses where highly loaded units are required which are sufficiently compact to be made mobile or be transportable.

The method of treating night soil according to this invention comprises the discharge of the night soil into a mixing chamber containing a supernatant sewage liquor, subjecting the mixture in this chamber to aerobic digestion, conveying the aerated mixture to a settlement zone, transferring all or part of the upper portion of the effluent in the settlement zone back to the mixing chamber, conveying all or part of the lower portion of the mixture in the settlement zone to a conditioning chamber and subjecting the material in the conditioning chamber to further aeration, and thereafter recirculating it to the mixing chamber.

The apparatus for carrying out this method comprises a tank divided by partitions into a mixing chamber, a conditioning chamber, and a settlement chamber, aerators located in the mixing and conditioning chambers, means for transferring the lower portion of the material in the settlement chamber to the conditioning chamber and the upper portion of the material in the settlement chamber to the mixing chamber, means for transferring material in the conditioning chamber to the mixing chamber and inlets for the direct discharge of night soil into the mixing chamber.

Figure 2:
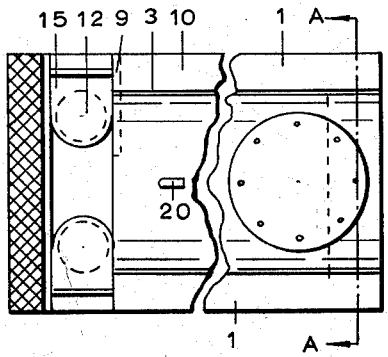
Figure 3:
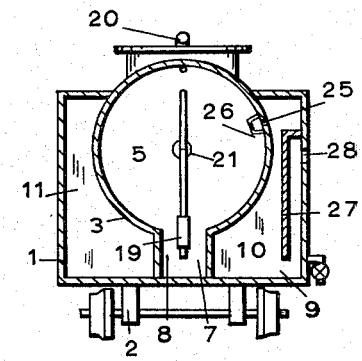

The invention is illustrated in the accompanying drawings in which:

FIG. 1 is a sectional side elevation of the apparatus according to this invention, and FIGS. 2 and 3 are respectively, a plan and sectional end elevation on the line A—A of the apparatus shown in FIG. 1, and on a smaller scale.

As shown in the drawings there is provided a rectangular tanker body 1 mounted on a rail bogie 2 and partly enclosing a cylindrical tank 3 extending from the back of the tanker body 1 to near the front thereof. The cylindrical tank 3 is divided by a partition 4 into a conditioning chamber 55 and settlement chamber 6. The bottom of the settlement chamber 6 has an opening 7 connected to a duct 8 extending the full length of the tank 3 and also forming a partition dividing the space below the tank 3. (See FIGS. 2 and 3.) A further partition 9 extends laterally from the front of the tank 3 to the duct 8 and side and bottom of the tanker body 1 to form a compartment 10. This compartment 10 is the collection chamber, and the remainder of the space between the tank and tanker body provides the mixing chamber 11. The mixing chamber 11 thus extends between the front of the tank 3 and tanker body 1 and along the full length of one side of the tank 3. Obviously any other suitable form of partitioning may be used and if a collection chamber 10 is not required, the partition 9 may be omitted and the space on both sides of tank 3 used as part of a mixing chamber.

Lavatory seats 15 may be fitted directly over the inlets 12 or alternatively as illustrated, lavatory bowls 16 may be fitter over or in the inlet 12 with the seats 15 on the bowls. In the latter case the bowls 16 may embody a trap. Where the bowls 16 embody a trap they are flushed by effluent conveyed from the top of the settlement chamber 6 and for this purpose the top of said settlement chamber is connected by an airlift pump or other pump 17 to a cistern or cisterns 18 in turn connected to the bowls 16. The cisterns 18 may be of the type which flush automatically as soon as they are filled to a predetermined level, or be of the type in which flushing is effected when required by operation of a lever. Alternatively the bowls 16 may be eliminated to allow for direct defecation into the mixing chamber 11 in which case the flushing system is also eliminated.

An airlift or other form of pump 19 is provided to convey material from the bottom of the settlement chamber 6 to the conditioning chamber 5 and the latter is provided with an outlet vent 20.

Initially the apparatus is charged with water or effluent, and in use the night soil is then discharged into the mixing chamber 11 and is comminuted by fixed cutters 21 located in a tubular discharge duct 22 extending downwardly from the inlets 12. The cutters 21 are located below the liquid level in the mixing chamber 11 and tangentially directed air or liquid jets 23 positioned in the duct 22 so that they swirl the liquid in the duct 22 causing solid material passing through said duct to be brought into contact with the cutters 21 and thereby comminuted.

The material discharged into the mixing chamber 11 is aerated by the corresponding aerator 13 and undergoes a primary aerobic digestion to form a mixture of primary effluent, activated sludge and night soil. This mixture flows along duct 8 and under the quiescent conditions prevailing in the settlement chamber 6 and adjacent portion of the duct 8 the heavier material settles so that the material in the settlement chamber 6 increases in solids content from the top of the bottom thereof with generally a scum of light solid material formed on the top surface of the material in this chamber. This scum is returned by a small airlift pump (not shown) to the conditioning chamber 5.

The material in the lower part of the settlement chamber 6 and which has a high activated sludge content is conveyed by pump 19 to the conditioning chamber 5 where it undergoes secondary aerobic digestion. The material in the conditioning chamber 5 consisting mainly of a secondary effluent can overflow through aperture 24 into the mixing chamber 11 for repetition of the cycle.

The collection chamber 10 may or may not be necessary depending on the conditions of operation.

In operation part of the effluent is discharged as water vapour particularly from the vent 20. Solid carbonaceous material is also oxidised and discharged as carbon dioxide. Finally it would appear from the very small build up of nitrogenous matter forming a constituent of the night soil that nitrogen is also discharged in the form of nitrogen gas. Thus a collection chamber 10 is required only when this vapour and gas discharge does not at least compensate for the volume of night soil discharged into the apparatus. In this case there is an increase in the liquid level in the interconnected mixing and settlement chambers 11 and 6 until the supernatant liquor flows through aperture 25 into the collection chamber 10 from which it may be drained off. Scum on the top of the liquid in the settlement chamber 6 is prevented from flowing into the collection chamber by a baffle 26 and this scum is returned to the conditioning chamber 5 by a small airlift pump or the like (not shown).

In the arrangement shown in FIG. 3 a supply of disinfectant is maintained in the lower part of collection chamber 10. Effluent overflowing from the settlement chamber 6 via outlet 25 is constrained by the baffle 27 to flow through the disinfectant so that it is in a safe condition for discharge when it is finally discharged from the apparatus through outlet 28, positioned below the outlet 25.

It has been found in practice under high temperature mining conditions that provided the apparatus is not overloaded beyond its rated capacity, evaporation from the conditioning chamber 5 which is of course mainly due to the aeration of the mixture therein, is so great that not only is it unnecessary to discharge any effluent from the system but on the contrary, it is often necessary to add water to maintain minimum liquid levels.

To run the apparatus without any discharge of sludge or liquid effluent therefrom while still maintaining control of the activated sludge return has obvious advantages, however, it would normally be anticipated that, since all the liquid and solid contents of the apparatus are in some way continually recirculated, there would be such a build up of sludge, salts and nitrogenous and organic material as to inhibit the aerobic activated sludge process.

While it is possible that this might occur over a very extended period of use, in practice the apparatus has been operated under hot humid mining conditions for a period of nine months during which no effluent was discharged and it was necessary to maintain the liquid level by addition of water. There was no build up of mineral salts or other material sufficient in any noticeable manner to inhibit the aerobic digestion process. This apparatus had a 62.5 cubic foot capacity and served approximately 30 users.

In the application specified in the preceding paragraph dry air was used for aeration by a large pressure reduction and consequent expansion of highly compressed air before it was fed to the aerators. Under certain circumstances if advantage is to be taken of full effluent recirculation the evaporation of the effluent may have to be promoted. This may be done by increasing the extent of aeration beyond that necessary for the aerobic digestion and/or by heating the effluent. Thus, as shown, in the drawings heating coils 14 may be used. Heating of the effluent has its main application under cold operating conditions.

While the invention has been described in its application as a mobile unit for underground use it is not confined to this embodiment or use.

It will be appreciated that the rate of flow through the pumps and control of all stages of the process is effected by the rate of air supply to the pumps and aerators and that all necessary drain cocks and the like are provided.

What I claim as new and desire to secure by Letters Patent is:

1. Transportable apparatus for the aerobic digestion of night soil comprising a tank, a mixing chamber, a conditioning chamber and a settlement chamber in said tank, a vent connecting said conditioning chamber to atmosphere, aerators located in the mixing and conditioning chambers, means for transferring the lower portion of the material in the settlement chamber to the conditioning chamber and the upper portion of the material in the settlement chamber to the mixing chamber, means for transferring material in the conditioning chamber to the mixing chamber and an inlet for the direct discharge of night soil into the mixing chamber.

2. Transportable apparatus as claimed in claim 1 including wheels on which the tank is mounted.

3. Transportable apparatus for the aerobic digestion of night soil comprising a tank, a mixing chamber, a conditioning chamber, a settlement chamber and a collection chamber in said tank, an overflow outlet connecting the collection chamber to the settlement chamber, a vent connecting said conditioning chamber to atmosphere, aerators located in the mixing and conditioning chambers, means for transferring the lower portion of the material in the settlement chamber to the conditioning chamber and the upper portion of the material in the settlement chamber to the conditioning chamber to the mixing chamber and an inlet for the direct discharge of night soil into the mixing chamber.

4. Transportable apparatus for the aerobic digestion of night soil comprising a tank, a mixing chamber, a conditioning chamber and a settlement chamber in said tank, a vent connecting said conditioning chamber to atmosphere, aerators located in the mixing and conditioning chambers, means for transferring the lower portion of the material in the settlement chamber to the conditioning chamber and the upper portion of the material in the settlement chamber to the mixing chamber, means for transferring material in the conditioning chamber to the mixing chamber, an inlet for the direct discharge of night soil into the mixing chamber, a lavatory seat fitted on said inlet, a lavatory bowl located under said seat to discharge into the mixing chamber and means for flushing said bowl with effluent from the upper part of the settlement chamber.

5. Transportable apparatus for the aerobic digestion of night soil comprising a tank, a mixing chamber, a conditioning chamber and a settlement chamber in said tank, a vent connecting said conditioning chamber to atmosphere, heating equipment in said tank, aerators located in the mixing and conditioning chambers, means for transferring the lower portion of the material in the settlement chamber to the conditioning chamber and the upper portion of the material in the settlement chamber to the mixing chamber, means for transferring material in the conditioning chamber to the mixing chamber and an inlet for the direct discharge of night soil into the mixing chamber.

References Cited by the Examiner
UNITED STATES PATENTS

| | | | |
|---|---|---|---|
| 108,369 | 10/70 | Loewenstein | 71—12 |
| 163,238 | 5/75 | Painter | 23—259.1 |
| 638,919 | 12/99 | Giffen | 23—259.1 |
| 673,167 | 4/01 | Giffen | 71—12 |
| 1,178,299 | 4/16 | Cornelius | 23—259.1 |
| 1,617,014 | 2/27 | Derleth | 71—12 |

DONALL H. SYLVESTER, *Primary Examiner.*

ANTHONY SCIAMANNA, *Examiner.*